3,549,378
TRIS(1-AZIRIDINYL)PHOSPHAZO HARDENERS
Donald M. Burness and Robert A. Silverman, Rochester,
N.Y., assignors to Eastman Kodak Company, Rochester, N.Y., a corporation of New Jersey
No Drawing. Continuation-in-part of abandoned application Ser. No. 475,599, July 28, 1965. This application Feb. 5, 1969, Ser. No. 796,929
Int. Cl. G03c 1/30
U.S. Cl. 96—111          30 Claims

ABSTRACT OF THE DISCLOSURE

Hydrophilic colloids such as gelatin, casein and carboxylated polymers hardened with an aziridine compound which can be prepared from a carboxamide, a sulfonamide or a phosphamide by treating the amide with phosphorus pentachloride followed by reaction with ethylenimine are described. Bis{tri(1-aziridinyl)phosphazo}sulfone,

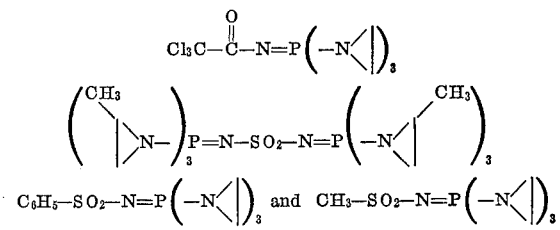

are illustrative of the aziridine hardener compounds employed.

---

This application is a continuation-in-part of our copending application Ser. No. 475,599 filed July 28, 1965.

This invention relates to hydrophilic compositions hardened with a hardening amount of the aziridine hardener compounds defined hereinafter. It relates, for example, to gelatin compositions including gelatin-silver halide emulsions containing therein as a hardener a substituted aziridine derived from a carboxamide, a sulfonamide or a phosphamide by treating the amide with phosphorus pentachloride followed by reaction with ethylenimine.

The hardening action of aziridines is well known in the art. Various bisaziridines and trisaziridines have been suggested as hardeners for gelatin. These compounds have on the whole shown themselves to be good gelatin hardeners except for considerable toxicity. Other aziridine compounds with somewhat less toxicity have been suggested as hardeners for gelatin.

One object of our invention is to provide gelatin hardeners which do not fog or desensitize gelatino silver halide photographic emulsions. Another object of our invention is to provide aziridine type hardeners considerably less toxic than many hardeners of this type suggested in the art. A further object of our invention is to provide hardeners that are useful for hardening hydrophilic materials such as gelatin, casein and carboxylated polymers, for example. A still further object of our invention is to provide gelatin hardeners that will withstand high temperature processing techniques as are often desirable for speeding up processing of photographic emulsions. Other objects of our invention will appear herein.

The carboxylated polymers mentioned herein may be polymers or copolymers prepared in part from acrylic acid or maleic anhydride or they may be derived polymers containing pendant carboxyl groups. Examples of the latter would be products prepared by reaction of maleic or phthalic anhydrides on polyvinyl alcohol or cellulose derivatives. The carboxylated polymers mentioned herein include copolymers derived from maleic anhydride and vinyl acetate as well as copolymers derived from acrylic acid and ethyl acrylate, for example.

The hardeners in accordance with our invention for the most part are made by reacting mono- or di- amide compounds such as carboxamides, sulfonamides, phosphamides or the like with phosphorus pentachloride followed by reaction with ethylenimine. The compounds prepared using diamides as the starting material ordinarily result in hexa-aziridine derivatives which are excellent hardeners for gelatin including gelatin-silver halide emulsions and for carboxyl polymers. The following illustrates the course of the reaction in preparing an aziridine derivative from a diamide:

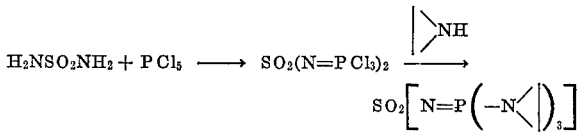

When a Monoamide is used as the starting material, a three aziridine group containing compound is ordinarily obtained and these compounds are also useful as hardeners for gelatin and for carboxylated polymers. That reaction is illustrated by the following:

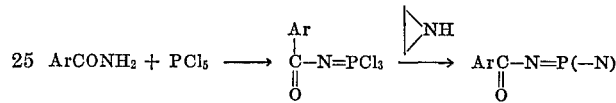

wherein Ar=aryl.

These compounds when added to gelatin, casein or carboxylated polymer compositions exhibit a hardening effect in almost any proportion although ordinarily a proportion of aziridine hardener of 0.5–5% based on the weight of the gelatin, casein or polymer is most convenient for use.

The aziridine hardeners in accordance with this invention have as a common grouping the tris(1-aziridinyl)-phosphazo moiety, i.e.,

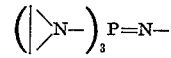

attached to a carbonyl, sulfonyl or phosphoryl linkage which in turn is attached to another organic radical. These are mostly represented by the following formula:

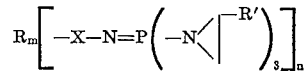

in which R is

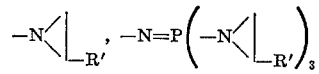

or a mono, bi or tervalent alkyl, aryl, aralkyl, cycloalkyl or heterocyclic radical and/or a substituted derivative thereof; R' is H, CH$_3$ or C$_2$H$_5$, X is CO, SO$_2$, PO or a combination thereof, m is 1 or 2, and n is 1, 2 or 3. Compounds useful as hardeners in accordance with our invention are as follows:

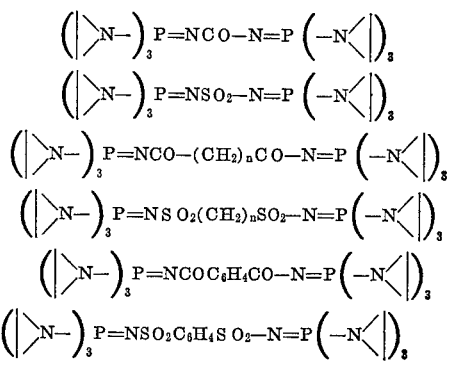

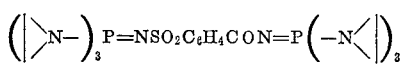

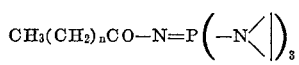

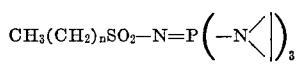

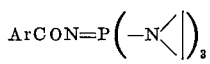

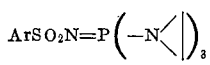

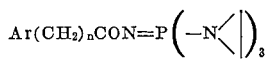

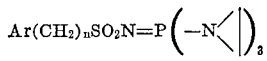

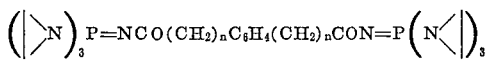

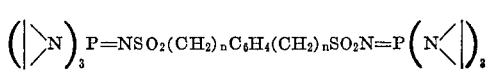

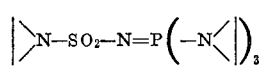

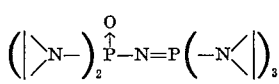

Also products prepared using as the starting amide, alicyclic carboxamides such as cyclohexylcarboxamide, or cyclopentylcarboxamide or a mono or dicarboxamide derived from the Diels Alder adducts of maleic anhydride with dienes such as butadiene, cyclopentadiene or the like exemplified by

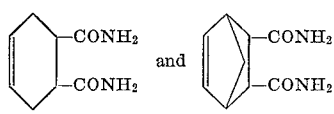

respectively.

The following examples illustrate our invention but it is to be understood that these examples are not limiting.

EXAMPLE 1

An aziridine derivative was prepared by reacting sulfamide with phosphorus pentachloride and ethylenimine by the procedure described by Kirsanov et al., J. Gen. Chem. (U.S.S.R.) (English transl.) 31, 3200 (1961). The colorless solid, bis-[tri(1-aziridinyl)phosphazo] sulfone, had a melting point of 93.5–94.5. This compound was used as a hardener in a gelatin-silver halide emulsion by adding portions thereof to separate portions of a high speed silver bromoiodide emulsion. Each emulsion sample was coated on a cellulose acetate film support at a coverage of 459 mg. of silver and 1040 mg. of gelatin per square foot. A sample of each film coating was exposed on an Eastman 1B sensitometer, processed for five minutes in Kodak DK–50 developer, fixed, washed, and dried with the following results:

| Concentration, g./mole Ag | Fresh | | | Percent swell in water |
|---|---|---|---|---|
| | Rel. speed | Gamma | Fog | |
| Control | 100 | 1.22 | .15 | 860 |
| 2.4 | 100 | 1.22 | .15 | 340 |
| 7.2 | 95 | 1.18 | .14 | 250 |
| 14.4 | 89 | 1.15 | .14 | 220 |

EXAMPLE 2

Additional aziridines were prepared using various amides, the procedure followed having been described in Example 1. The various compounds prepared are shown in the following table wherein the symbols R, R', and $n$ are those of general Formula I:

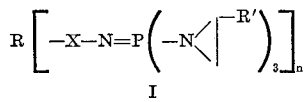

I

TABLE I

| | R | R' | X | n | M.P. °C. | Calculated | | | | Found | | | |
|---|---|---|---|---|---|---|---|---|---|---|---|---|---|
| | | | | | | C | H | N | Cl | C | H | N | Cl |
| Hardener: | | | | | | | | | | | | | |
| A | Cl₃C | H | CO | 1 | 62–63 | 30.3 | 3.8 | | 33.4 | 30.5 | 3.7 | | 33.6 |
| B | C₆H₅ | H | CO | 1 | 54.5–55.5 | 56.5 | 6.2 | 20.2 | | 56.2 | 6.2 | 19.9 | |
| C | C₆H₅ | H | SO₂ | 1 | 98.5–99 | 46.2 | 5.5 | 17.9 | | 45.8 | 5.3 | 17.6 | |
| D | p—C₆H₄ | H | CO | 2 | 176 dec. | 50.5 | 5.9 | 23.6 | | 50.4 | 6.2 | 23.4 | |
| E | ▱N | H | SO₂ | 1 | 106–107 | 34.6 | 5.8 | 25.2 | | 34.9 | 6.0 | 25.6 | |
| F | —N=P(—N⟨CH₃)₃ | CH₃ | SO₂ | 1 | (¹) | 44.2 | 7.4 | 22.8 | | 43.0 | 7.9 | 20.2 | |
| G | CH₃ | H | SO₂ | 1 | 116–117 | 33.5 | 6.0 | 22.4 | | 33.6 | 6.1 | 22.3 | |
| H | m—C₆H₄ | H | CO | 2 | 143.5–144 | 50.5 | 5.9 | 23.6 | | 50.5 | 6.2 | 23.3 | |

¹ Oil.

These compounds were then incorporated in separate portions of a high speed silver bromoiodide emulsion in the proportions indicated as compared with the control in which no hardener was added. Each emulsion sample was then coated on a cellulose acetate film support at a coverage of 459 mg. of silver and 1040 mg. of gelatin per square foot. Samples of the films were exposed on an Eastman 1B sensitometer, processed for 5 minutes in Kodak DK–50 developer, fixed, washed, and dried. Tests were run on the fresh samples. The results obtained with the various samples were as follows:

aldehyde-type gelatin hardeners with substituted aziridine hardeners of the type described herein.

TABLE II

| Hardener | Conc. (g./m.) | Fresh | | | 1 week incubation | | | 2 weeks incubation | | | Vertical swell in H₂O (percent) |
|---|---|---|---|---|---|---|---|---|---|---|---|
| | | Rel. speed | Gamma | Fog | Rel. speed | Gamma | Fog | Rel. speed | Gamma | Fog | |
| None | | 100 | 1.24 | .14 | 71.00 | 1.09 | .17 | 49.00 | .91 | .34 | 720 |
| F | 7.2 | 94 | 1.18 | .15 | 10.20 | .65 | .50 | 3.30 | .45 | .83 | 380 |
| F | 14.4 | 97 | 1.17 | .14 | 2.35 | .38 | .71 | | >10.00 | | 280 |
| None | | 100 | 1.29 | .14 | 85.00 | 1.07 | .17 | | | | 720 |
| A | 2.4 | 89 | 1.32 | .12 | 19.00 | .75 | .55 | | | | 470 |
| A | 7.2 | 89 | 1.25 | .11 | | | >1.00 | | | | 370 |
| A | 14.4 | 89 | 1.22 | .10 | | | >1.00 | | | | 360 |
| None | | 100 | 1.25 | .11 | 85.00 | 1.06 | .15 | 53.00 | .96 | .30 | 730 |
| E | 2.4 | 100 | 1.27 | .10 | 14.00 | .75 | .34 | 6.90 | .62 | .62 | 340 |
| E | 7.2 | 95 | 1.23 | .10 | 7.10 | .52 | .34 | 2.35 | .38 | .58 | 250 |
| E | 14.4 | 95 | 1.22 | .10 | 2.90 | .40 | .20 | 0.97 | .32 | .32 | 190 |
| B | 2.4 | 97 | 1.28 | .10 | | | >1.00 | | | | 440 |
| B | 7.2 | 97 | 1.22 | .11 | | | >1.00 | | | | 290 |
| B | 14.4 | 97 | 1.17 | .09 | 1.80 | .37 | .62 | (¹) | .25 | .83 | 250 |
| None | | 100 | 1.28 | .11 | 87.00 | 1.15 | .13 | 69.00 | 1.12 | .30 | 770 |
| C | 2.4 | 91 | 1.33 | .09 | 19.50 | .83 | .37 | 5.70 | .62 | .81 | 480 |
| C | 7.2 | 85 | 1.47 | .10 | 5.50 | .57 | .51 | 1.30 | .33 | .87 | 310 |
| C | 14.4 | 82 | 1.20 | .12 | 2.05 | .42 | .28 | 0.62 | .30 | .42 | 260 |
| D | 2.4 | 94 | 1.32 | .10 | 6.70 | .53 | .90 | | | >1.00 | 420 |
| D | 7.2 | 95 | 1.23 | .10 | 2.20 | .38 | .85 | | | >1.00 | 290 |
| D | 14.4 | 97 | 1.18 | .10 | 0.91 | .32 | .52 | (¹) | .15 | .70 | 230 |
| G | 2.4 | 107 | 1.32 | .10 | 17.50 | .83 | .32 | 8.50 | .65 | .65 | 380 |
| G | 7.2 | 105 | 1.22 | .09 | 9.50 | .57 | .38 | 2.15 | .32 | .72 | 240 |
| G | 14.4 | 105 | 1.13 | .10 | 3.80 | .38 | .24 | 0.91 | .30 | .39 | 200 |

¹ Slow.

EXAMPLE 3

P,P - bis (1 - aziridinyl) - p - [tris - (1 - aziridinyl) phosphazo]-phosphine oxide was incorporated in separate portions of a high speed silver bromoiodide emulsion in the manner described in Example 2. The proportions used and the test results were as follows:

| Hardener (g./Ag mole) | Rel. speed | Gamma | Fog | Percent swell in water |
|---|---|---|---|---|
| Control | 100 | 1.25 | 0.18 | 810 |
| 2.4 | 82 | 0.98 | 0.26 | 280 |
| 7.2 | 80 | 0.90 | 0.24 | 220 |
| 14.4 | 69 | 0.85 | 0.28 | 190 |

The substituted aziridine hardeners described herein are of value for gelatin compositions containing couplers. Photographic color print materials ordinarily include gelatin layers containing silver halide and a coupler corresponding to the type of sensitivity of the photographic emulsion. It is desirable to include in these layers some kind of a gelatin hardener to render those layers resistant to disintegration by aqueous processing solutions. The commonly used gelatin hardeners do not prevent and oftentimes promote staining of paper or other supports upon which these layers reside which may adversely affect the quality of the prints obtained therefrom.

The hardeners listed herein are of value in gelatin compositions containing couplers as applied to a support such as of paper whereby staining is minimized or even inhibited when those products are used for making photographic prints. Our invention is useful for instance in emulsions containing pyrazolone couplers such as those described in U.S. Pat. No. 2,600,799 of Loria et al. We have found that gelatin compositions containing couplers and hardeners, the hardener being of the type described herein, have good brightness characteristics and are more free of stain than compositions of like nature in which hardeners of some other types are used. The following example illustrates the advantage of our invention in the obtaining of photographic prints from materials used in accordance with our invention:

EXAMPLE 4

This example illustrates color photographic print materials comparing the results obtained using conventional aldehyde-type gelatin hardeners with substituted aziridine hardeners of the type described herein.

A series of coatings where laid down upon a paper support as follows:

Layer 6.—a gelatin layer.
Layer 5.—a red-sensitive gelatino silver chlorobromide emulsion, of which approximately 90 mole percent of the halide is bromide containing a phenolic cyan coupler of the type described in U.S. Pat. 2,423,730.
Layer 4.—a gelatin layer containing an ultraviolet absorber.
Layer 3.—a green-sensitive gelatino silver chlorobromide emulsion of which approximately 80 mole percent of the halide is chloride and a pyrazolone magenta coupler of the type described in U.S. Pat. 2,600,788.
Layer 2.—a gelatin layer.
Layer 1.—applied directly upon paper support a blue-sensitive gelatino silver chlorobromide emulsion of which approximately 98 mole percent of the halide is bromide and an acyl acetanilide yellow coupler of the type described in U.S. Pat. 2,875,057.

Samples A and B were prepared. A was composed of the layers as outlined, in each of the layers of which 0.54% of mucochloric acid (based on the weight of the gelatin) was used as the hardener. In Sample B each of the six layers contained 0.5%, based on the weight of the gelatin, of bis[tri(1-aziridinyl)phosphazo] sulfone. The various color photographic print samples were exposed and processed. It was found that the reflectance of Sample B represented a distinct improvement over that of Sample A at various wave lengths thus showing better stain properties.

Instead of the hardener employed any of the other hardeners referred to herein are useful in this connection showing less stain than like products having an aldehyde-type hardener therein.

As shown hereinafter, the aziridine hardener compounds in accordance with our invention harden carboxylated polymers.

EXAMPLE 5

Solutions in water were prepared, containing 5% by weight of the vehicle, 0.05% by weight of Triton X-200E surfactant (sodium salt of alkylaryl polyether sulfonate made by the Rohm and Haas Company and believed to have the formula:

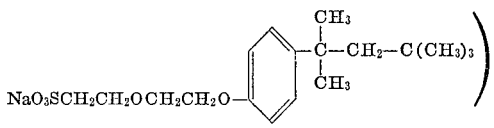

and 0.15% by weight of hardener (i.e., 3% of the weight of the vehicle) and coated on glass plates with a 12 mil coating knife. The coatings were kept for seven days at a temperature of 73.5–76° F. and a relative humidity of 36–55%. Separate samples of the resulting films were then removed from the plates and immersed in (1) distilled water at 23° C. and (2) dilute sodium hydroxide solution (pH 10.2) at 23° C. with the following results:

two solutions was started under nitrogen and with vigorous stirring:

(a) 100 g. of ethyl acrylate, 25 g. of acrylic acid
(b) 3.9 ml. of Triton 770, 0.2 g. of sodium bisulfite in 125 ml. of water The additions were completed in eleven minutes and followed by twenty minutes of vigorous stirring. Conversion to polymer was quantitative giving a polymer with an inherent viscosity in acetone of 0.86. Neutralization of the emulsion (diluted to ten percent solids with 30 percent aqueous isopropyl alcohol) with concentrated ammonium hydroxide in the presence of 15 percent aqueous isopropyl alcohol produced a solution at pH 6.8 with excellent clarity. Triton 770 is a surfactant sold

TABLE III

| | | | Properties of Film | |
| --- | --- | --- | --- | --- |
| Item No.: | Vehicle | Hardener | Distilled water | Water at pH 10.2 |
| 1 | * | None | Dissolves readily | Dissolves readily. |
| 2 | * | bis[tri(1-aziridinyl)phosphazo]sulfone | Firm | Firm. |
| 3 | * | $CH_3\overset{O}{\underset{O}{\overset{\|}{\underset{\|}{S}}}}-N=P(-N{<}|)_3$ | Swollen, soft | Swollen, soft. |
| 4 | * | $\overset{}{\underset{}{N}}-\overset{O}{\underset{O}{\overset{\|}{\underset{\|}{S}}}}-N=P(-N{<}|)_3$ | Swollen, firm | Swollen, firm. |
| 5 | * | $Cl_3C-\overset{O}{\underset{\|}{C}}-N=P(-N{<}|)_3$ | Swollen, soft | Partially disintegrates. |
| 6 | ** | None | Dissolves slowly | Dissolves slowly. |
| 7 | ** | $(\overset{H_3C}{N}{<}|-)_3 P=N-\overset{O}{\underset{\|}{S}}-N=P(-N{<}|\overset{CH_3}{})_3$ | Firm | Firm. |
| 8 | ** | bis[tri(1-aziridinyl)phosphazo]sulfone | Firm | Firm. |
| 9 | ** | Hardener D of Table I | Firm | Firm. |

The carboxylated vehicle employed in items 1–5 of Table III designated by * is the sodium salt of the carboxy-ester lactone of a vinyl acetate-maleic anhydride interpolymer. The preparation of the polymeric carboxy-ester lactone just mentioned is described in Example 2 of U.S. Pat. 3,169,946. The conversion of the polymeric carboxy-ester lactone to the sodium salt, as well as to other alkali metal salts such as the lithium salt, for example, is shown in Examples 17, 19, 20, 21, 22 and 23 of Minsk U.S. Pat. 3,169,946, issued Feb. 16, 1965. The other alkali metal salts, such as the lithium and potassium salts, for example, of the carboxy-ester lactone of a copolymer prepared from maleic anhydride and vinyl acetate can be employed as the vehicle in place of the sodium salt form used in items 1–5 of Table III. The sodium salt form is preferred, for example, for reasons of economy.

The carboxylated vehicle employed in items 6–9 of Table III designated by ** is a copolymer prepared by the emulsion polymerization of 80 weight percent ethyl acrylate and 20 weight percent acrylic acid in the presence of potassium persulfate catalyst. Its preparation is described in Example 6 hereinafter.

EXAMPLE 6

A solution of 3.9 ml. of Triton 770 (40 percent material was used in this example) in 375 ml. of distilled water was prepared under nitrogen and heated to 80° in a constant temperature bath. To this was added 1.5 g. of potassium persulfate and 0.3 g. of sodium bisulfite. Immediately the simultaneous addition of the following by Rohm and Haas Company, and it is described as the sodium salt of an alkylaryl polyether sulfate.

The carboxylated polymers which can be hardened with the hardening compounds of our invention are not restricted to those specifically disclosed in Examples 5 and 6. The carboxylated polymers (i.e., polymers containing carboxyl groups) can be any of those shown in Yudelson U.S. Pat. 3,017,280, issued Jan. 16, 1962, in the form of their alkali metal salts. The various types of carboxyl containing polymers are disclosed starting at line 37 of column 1 and ending at line 8 of column 2. Examples 1–11 of the Yudelson patent discloses the hardening of various carboxylated polymers in their ammonium salt form. These polymers in their alkali metal salt form, such as their sodium salt form, can be hardened with the hardener compounds of our invention.

The particular manner in which the carboxylated polymers are prepared is not part of our invention. As shown by Yudelson U.S. Pat. 3,017,280, they can be prepared by the solution or dope polymerization method using azo bis isobutyronitrile as a catalyst or by an emulsion polymerization technique. As shown to those skilled in the polymerization art, catalysts other than those specifically disclosed herein can be employed in the polymerization reactions.

Alkyl acrylates that can be employed in the polymerization reaction with acrylic acid include, for example, methyl acrylate, ethyl acrylate, n-propyl acrylate, n-butyl acrylate, methyl methacrylate, ethyl methacrylate, n-propylacrylate and n-butyl methacrylate. Methacrylic acid can be substituted for acrylic acid in the polymerization reactions just noted.

The carboxylated polymers can be used as the vehicle in silver halide photographic emulsions, such as silver chloride and silver bromoiodide emulsions, for example. These emulsions can be hardened with one or more of the hardening compounds used in hardening the various hydrophilic colloids disclosed herein. Mixtures of gelatin and at least one of the other hydrophilic colloids can be used to form compositions containing no silver halide or to form silver halide emulsions and the resulting compositions can be hardened with one or more of the hardening compounds used by us.

The high speed silver bromoiodide emulsion referred to hereinbefore is of the type described by A.P.H. Trivelli and W. F. Smith in The Photographic Journal, vol. 79, pages 330–338 (1939).

The invention has been described in considerable detail with particular reference to certain preferred embodiments thereof, but it will be understood that variations and modifications can be effected within the spirit and scope of the invention as described hereinbefore.

We claim:

1. A composition of matter comprising a hydrophilic colloid and a hardening amount of an aziridine hardener selected from the aziridine hardener compounds having the formulas:

(1) 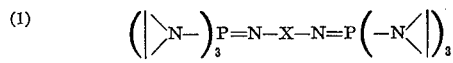

(2) 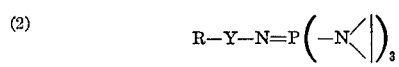

(3) 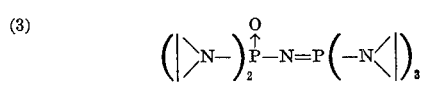

(4) 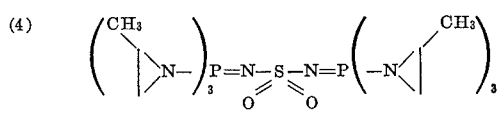

wherein X is CO, SO$_2$, CO(CH$_2$)$_n$CO, SO$_2$(CH$_2$)$_n$SO$_2$, COC$_6$H$_4$CO, SO$_2$C$_6$H$_4$SO$_2$, SO$_2$C$_6$H$_4$CO, CO(CH$_2$)$_n$C$_6$H$_4$(CH$_2$)$_n$CO or SO$_2$(CH$_2$)$_n$C$_6$H$_4$(CH$_2$)$_n$SO$_2$ R is Cl$_3$C, phenyl,

a low carbon alkyl hydrocarbon radical or an aralkyl radical, Y is CO or SO$_2$ and $n$ is a small whole number.

2. A composition of matter in accordance with claim 1 wherein the hydrophilic colloid is gelatin.

3. A composition of matter in accordance with claim 1 wherein the hydrophilic colloid is a carboxylated polymer.

4. A composition of matter in accordance with claim 1 wherein the hydrophilic colloid is an alkali metal salt of a carboxy-ester lactone of a copolymer prepared from maleic anhydride and vinyl acetate.

5. A composition of matter in accordance with claim 1 wherein the hydrophilic colloid is the sodium salt of a carboxy-ester lactone of a copolymer prepared from maleic anhydride and vinyl acetate.

6. A composition of matter in accordance with claim 1 wherein the hydrophilic colloid is a copolymer prepared from acrylic acid and ethyl acrylate.

7. A composition of matter comprising a hydrophilic colloid and a hardening amount of bis{tri(1-aziridinyl)-phosphazo}sulfone.

8. A composition of matter in accordance with claim 7 wherein the hydrophilic colloid is gelatin.

9. A composition of matter in accordance with claim 7 wherein the hydrophilic colloid is a carboxylated polymer.

10. A composition of matter in accordance with claim 7 wherein the hydrophilic colloid is the sodium salt of a carboxy-ester lactone of a copolymer prepared from maleic anhydride and vinyl acetate.

11. A composition of matter in accordance with claim 7 wherein the hydrophilic colloid is a copolymer prepared from acrylic acid and ethyl acrylate.

12. A composition of matter in accordance with claim 1 comprising a hydrophilic colloid and a hardening amount of

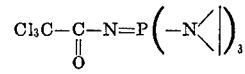

13. A composition of matter in accordance with claim 12 wherein the hydrophilic colloid is the sodium salt of a carboxy-ester lactone of a copolymer prepared from maleic anhydride and vinyl acetate.

14. A composition of matter in accordance with claim 1 comprising a hydrophilic colloid and a hardening amount of

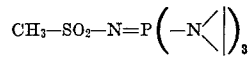

15. A composition of matter in accordance with claim 14 wherein the hydrophilic colloid is a copolymer prepared from acrylic acid and ethyl acrylate.

16. A composition of matter in accordance with claim 1 comprising a hydrophilic colloid and a hardening amount of

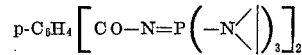

17. A composition of matter in accordance with claim 16 wherein the hydrophilic colloid is a copolymer prepared from acrylic acid and ethyl acrylate.

18. A composition of matter in accordance with claim 1 wherein the hydrophilic colloid is the sodium salt of a carboxy-ester lactone of a copolymer prepared from maleic anhydride and vinyl acetate and the hardener is

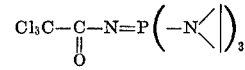

19. A composition of matter in accordance with claim 1 wherein the hydrophilic colloid is the sodium salt of a carboxy-ester lactone of a copolymer prepared from maleic anhydride and vinyl acetate and the hardener is

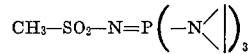

20. A composition of matter in accordance with claim 1 wherein the hydrophilic colloid is the sodium salt of a carboxy-ester lactone of a copolymer prepared from maleic anhydride and vinyl acetate and the hardener is

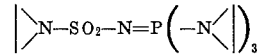

21. A composition of matter in accordance with claim 1 wherein the hydrophilic colloid is gelatin and the hardener is

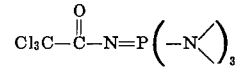

22. A composition of matter in accordance with claim 1 wherein the hydrophilic colloid is gelatin and the hardener is

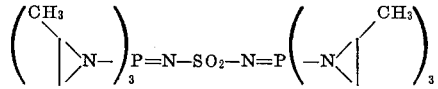

23. A composition of matter in accordance with claim 1 wherein the hydrophilic colloid is gelatin and the hardener is

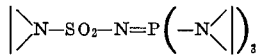

24. A composition of matter in accordance with claim 1 wherein the hydrophilic colloid is gelatin and the hardener is

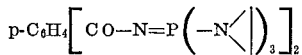

25. A composition of matter in accordance with claim 1 wherein the hydrophilic colloid is gelatin and the hardener is

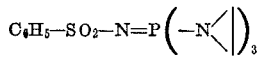

26. A composition of matter in accordance with claim 1 wherein the hydrophilic colloid is gelatin and the hardener is

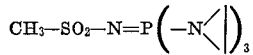

27. A gelatin-silver halide photographic emulsion containing a hardening amount of an aziridine compound selected from the aziridine hardener compounds having the formulas set forth in claim 1.

28. A gelatin-silver halide photographic emulsion containing a color coupler and a hardening amount of an aziridine compound selected from the aziridine hardener compounds having the formulas set forth in claim 1.

29. A gelatin-silver halide photographic emulsion in accordance with claim 27 containing as the hardener therein a hardening amount of bis{tri(1-aziridinyl)phosphazo}sulfone.

30. A gelatin-silver halide photographic emulsion in accordance with claim 28 containing a color coupler and a hardening amount of bis{tri(1-aziridinyl)phosphazo}sulfone.

References Cited

UNITED STATES PATENTS 2,964,404  12/1960  Burness _____ 96—85

FOREIGN PATENTS 1,224,860  6/1960  France _____ 96—111

NORMAN G. TORCHIN, Primary Examiner

R. E. FICHTER, Assistant Examiner

U.S. Cl. X.R.

260—239, 117; 106—125